US008296281B2

(12) United States Patent
Baker et al.

(10) Patent No.: US 8,296,281 B2
(45) Date of Patent: Oct. 23, 2012

(54) SYSTEM AND METHOD FOR NOTIFICATIONS RELATING TO FLIGHT TRACKING OR PLANNING

(75) Inventors: Daniel Baker, Houston, TX (US); Karl Lehenbauer, Houston, TX (US); David Cameron McNett, Austin, TX (US)

(73) Assignee: FlightAware, LLC, Houston, TX (US)

( * ) Notice: Subject to any disclaimer, the term of this patent is extended or adjusted under 35 U.S.C. 154(b) by 254 days.

(21) Appl. No.: 12/359,829

(22) Filed: Jan. 26, 2009

(65) Prior Publication Data

US 2010/0191754 A1 Jul. 29, 2010

(51) Int. Cl.
*G06F 7/00* (2006.01)
*G06F 17/30* (2006.01)

(52) U.S. Cl. ........ 707/706; 707/722; 707/736; 707/790; 701/3

(58) Field of Classification Search .................. 707/705, 707/706, 722, 736, 790; 701/3
See application file for complete search history.

(56) References Cited

U.S. PATENT DOCUMENTS

| | | | |
|---|---|---|---|
| 5,623,260 A | 4/1997 | Jones | |
| 6,278,936 B1 | 8/2001 | Jones | |
| 6,317,060 B1 | 11/2001 | Jones | |
| 6,393,359 B1 | 5/2002 | Flynn et al. | |
| 6,580,998 B2 | 6/2003 | Flynn et al. | |
| 6,714,859 B2 | 3/2004 | Jones | |
| 6,804,606 B2 | 10/2004 | Jones | |
| 6,952,645 B1 | 10/2005 | Jones | |
| 7,030,781 B2 | 4/2006 | Jones | |
| 7,065,443 B2 | 6/2006 | Flynn et al. | |
| 7,171,369 B1* | 1/2007 | Bertram et al. | 705/5 |
| 2002/0194037 A1* | 12/2002 | Creed et al. | 705/5 |
| 2003/0137435 A1 | 7/2003 | Haddad et al. | |
| 2004/0267781 A1* | 12/2004 | Smolgovsky et al. | 707/100 |
| 2005/0187677 A1 | 8/2005 | Walker | |
| 2005/0216281 A1* | 9/2005 | Prior | 705/1 |
| 2005/0267653 A1* | 12/2005 | Matsushita et al. | 701/14 |
| 2006/0059024 A1 | 3/2006 | Bailey et al. | |
| 2007/0276706 A1* | 11/2007 | Dunsky | 705/5 |

(Continued)

OTHER PUBLICATIONS

FlightAware Frequently Asked Questions, www.flightaware.com Feb. 19, 2006.

(Continued)

*Primary Examiner* — Hares Jami
(74) *Attorney, Agent, or Firm* — Woodard, Emhardt, Moriarty, McNett & Henry LLP (57) ABSTRACT

A computer-implemented system and method processes flight position information and provides a notification to a remote user in response to a triggering event. Typically, flight position data is received over a digital network. The service accepts requests for notification based upon the position of a specified flight and subsequently provides that notification based upon the flight position data. Upon receiving a user query, a server retrieves a result set from the flight position data and determines if the triggering criteria has been met. In one form, the requested notification may be presented to the user in the form of an e-mail, telephone call, text message or the like. Also disclosed is a system for flight tracking or planning which includes photographs supplied by remote users of the aircraft for which the tracking or planning is associated, for use by other remote users that see the association of the supplied photos with the tracked or planned flight. Still further disclosed is a social system for use with flight tracking or planning which allows affiliated users to share information to the exclusion of other non-affiliated users.

4 Claims, 8 Drawing Sheets

U.S. PATENT DOCUMENTS

| | | | |
|---|---|---|---|
| 2008/0036659 A1* | 2/2008 | Smith et al. | 342/454 |
| 2008/0046280 A1 | 2/2008 | Horstemeyer | |
| 2008/0228330 A1* | 9/2008 | Srinivasan et al. | 701/3 |
| 2009/0215469 A1* | 8/2009 | Fisher et al. | 455/456.3 |
| 2009/0216746 A1* | 8/2009 | Aubin et al. | 707/5 |
| 2010/0309310 A1* | 12/2010 | Albright | 348/135 |

OTHER PUBLICATIONS www.aa.com, American Airlines Flight Notification website, 5 pages, Printed Jan. 25, 2009.

www.flightstats.com, Flight Alert and Flight Tracking website, 3 pages, Printed Jan. 25, 2009.

* cited by examiner

SYSTEM AND METHOD FOR NOTIFICATIONS RELATING TO FLIGHT TRACKING OR PLANNING

FIELD OF THE INVENTION

The present invention generally relates to a system and method for receiving and processing flight positioning data and associated content or for receiving flight planning information, and thereafter for notifying a user. More particularly, the present invention pertains to a flight tracking, flight planning and/or notification service accessible over the Internet.

BACKGROUND

In 1995, the United States Federal Aviation Administration (FAA) made a wealth of minute-by-minute flight-tracking information available for distribution to the public with the creation of the Aircraft Situation Display to Industry (ASDI) service. Through this service, flight tracking data is made available to several vendors who are subsequently able to provide information in a value-added format to their subscribers or other users. The ASDI information includes the location, altitude, airspeed, origin, destination, estimated time of arrival and tail number or designated identifier of air carrier and general aviation aircraft operating on at least the corresponding IFR flight plans within U.S. airspace. General aviation VFR flights that include air traffic control flight following are often included. Traditional subscribers include flight departments, charter operators, limousine firms, airframe and power plant manufacturers, air carriers, fixed base operators (FBOs), research firms, and other users.

With the advent of this structure, a number of subscribers and other users were able to obtain valuable flight information and increase the efficiency and reliability of their services. However, in order to utilize this data, interested parties had to either receive it themselves, which could be cost prohibitive, or rely upon a third-party service. For example, an aircraft service provider could not reliably know much in advance as to when food service or fuel would need to be delivered for incoming flights, so as to give its employees time to prepare just enough in advance as to have the food at the right temperature and condition, and the fuel truck in position, at the appropriate time, but with a minimum of waiting. In a similar manner, a casual user could not receive reliable advance notification as to when to leave to go to the airport to meet or pick up someone from an arriving flight so that neither would need to wait on the other. In addition, a member of a common group of users could not automatically and privately share geographically linked aviation related content with another member of the group in a convenient manner when the other was either planning a flight or tracking a flight. The inventors solved a number of these problems as well as other problems present in the aviation information industry, as are illustrated in the descriptions that follow.

DETAILED DESCRIPTION

For the purposes of promoting and understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

At any given moment there are likely to be more than 5,000 aircraft flying above the United States. In the course of a single day, more than 50,000 flights are completed from origination to destination. The term "destination" herein means the location where the flight lands and stops flying, at least for a while. There can be both intermediate destinations, such as landing for refueling before continuing to a further destination, and final destinations, such as landing to complete the purpose of the flight.

Currently, systems exist which provide near-real time flight tracking information and notification. See, for example, flightaware.com. Users can obtain information such as aircraft departure, aircraft arrival, aircraft change of destination, and/or aircraft flight plan changes. By using aircraft identifiers such as its flight or tail number, the user can be notified by instant messaging or email of the information desired. This enables users to check up on flights of their family or friends, business owners to maintain the current status of their aircraft, and aircraft service providers to roughly time their supply of related services. While prior art systems exist that can provide e-mail notification when a specified flight has departed or when it has arrived, a need still remains for users to obtain more accurate arrival time estimates prior to the arrival of a specified flight. For instance, a user needing to pick up a family member at the airport 20 miles away might wish to be notified when the selected flight is within 100 miles, or will arrive within 30 minutes. Other users, such as those providing food or fuel services to private aircraft may be able to improve their service with an accurate advance notification.

Figure 1:
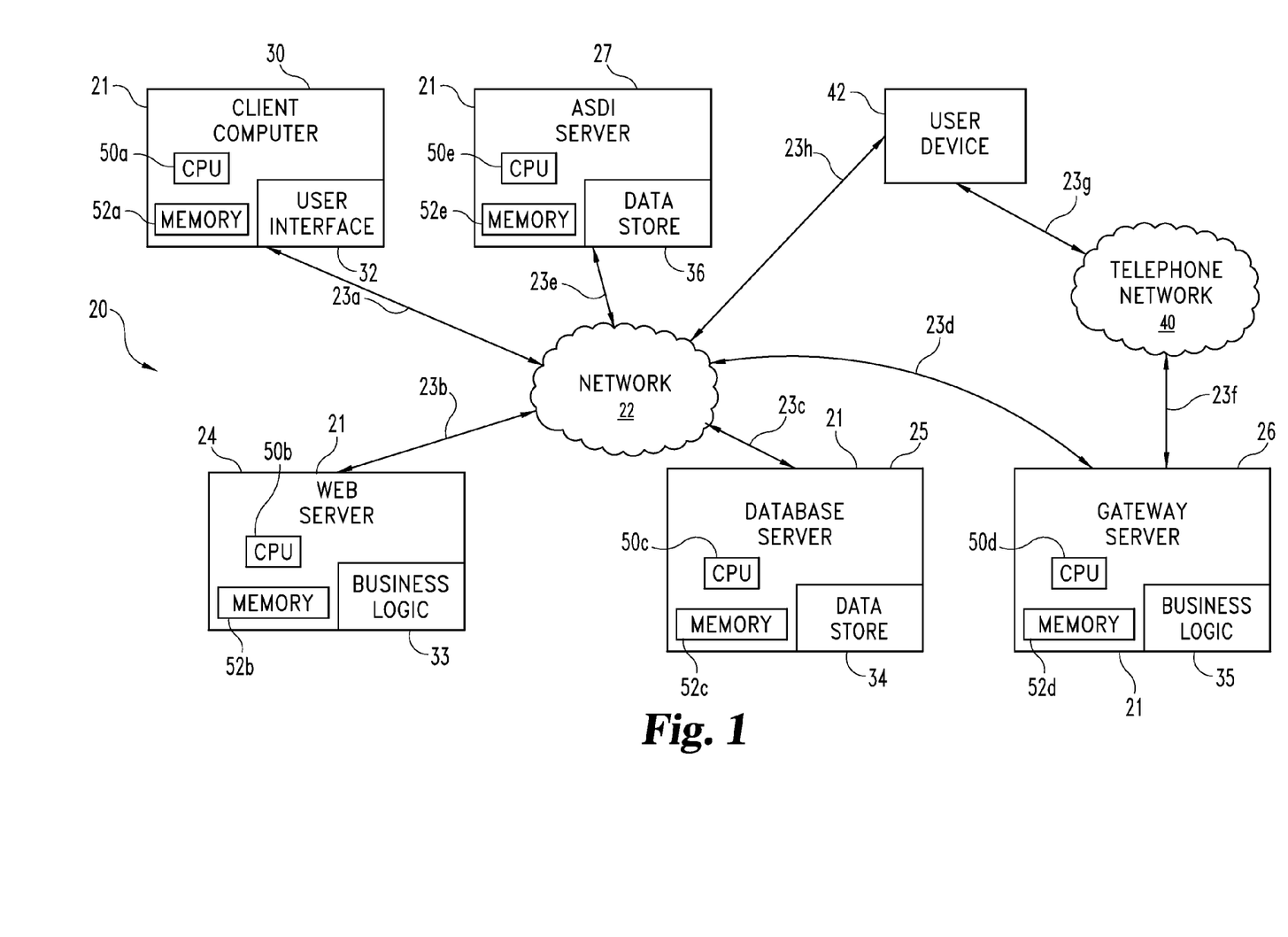
FIG. 1 is a diagrammatic view of a computer system of one implementation.

Turning to FIG. 1, a diagrammatic view of computer system 20 suitable for use in one embodiment of the present invention is shown. Computer system 20 includes computer network 22, and functions to provide the novel service described herein. Computer network 22 couples together a number of computers 21 over network pathways 23*a*-23*e*. Telephone network 40 couples together Gateway Server 26 and user device 42 over pathways 23*f* and 23*g*. Preferably, telephone network 40 comprises both the PSTN and one or more cellular networks. In one form, computers 21 may also be connected to user device 42 through network 22 via network pathway 23h, such as when user device 42 is a VoIP endpoint, wireless device, smart phone, or other digital communication device. Any of pathways 23 may alternatively be traditional PSTN connections, digital lines (such as T1, T3, OC3), or any other transmission medium suitable for carrying content, such as a wireless or cellular network.

More specifically, system 20 includes several servers, namely Web Server 24, Database Server 25, Gateway Server 26, and ASDI Server 27. System 20 also includes at least one client computer 30. While computers 21 are each illustrated as being a server or client, it should be understood that any of computers 21 may be arranged to include both a client and server. Furthermore, it should be understood that while five computers 21 are illustrated, more or fewer may be utilized in alternative embodiments. In particular, it shall be appreciated that a large number of client computers, similar to client computer 30, may be in use within system 20 for performing operations such as allowing numerous individual remote users or entities to connect to Web Server 24.

Turning to implementation specifics, in the illustrative embodiment, computers 21 include one or more processors or CPUs (50a, 50b, 50c, 50d, and 50e respectively) and one or more types of memory (52a, 52b, 52c, 50d, and 52e respectively). Each memory 52a-e preferably includes a removable memory device. Each processor 50a-50e may be comprised of one or more components configured as a single unit. Alternatively, when of a multi-component form, a processor 50a-50e may have one or more components located remotely relative to the others. One or more components of each processor 50a-50e may be of the electronic variety defining digital circuitry, analog circuitry, or both. In one embodiment, each processor 50a-50e is of a conventional, integrated circuit microprocessor arrangement, such as one or more OPTERON® processors supplied by ADVANCED MICRO DEVICES Corporation of One AMD Place, Sunnyvale, Calif. 94088, USA.

Each memory 52a-52e (removable or generic) is one form of a computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

Although not shown, in one embodiment each computer 21 is coupled to a display and/or includes an integrated display. Computers 21 may be of the same type, or a heterogeneous combination of different computing devices. Likewise, displays may be of the same type, or a heterogeneous combination of different visual devices. Although not shown, each computer 21 may also include one or more operator input devices such as a keyboard or mouse to name just a few representative examples. Also, besides a display, one or more other output devices may be included such as a printer. As such, various display, input and output device arrangements are possible.

Computer network 22 can be in the form of a wireless or wired Local Area Network (LAN), Municipal Area Network (MAN), Wide Area Network (WAN), such as the Internet, a combination of these, or such other network arrangement as would occur to those skilled in the art. In a further form, several computers 21, such as Web Server 24, Database Server 25, and Gateway Server 26 may be coupled together by a secure portion of network 22 while remaining connected to ASDI Server 27 and client computer 30 via an unsecured portion of network 22. The operating logic of system 20 can be embodied in signals transmitted over network 22, in programming instructions, dedicated hardware, or a combination of these. It should be understood that more or fewer computers 21 can be coupled together by computer network 22.

In one embodiment, system 20 operates at one or more physical locations. Web Server 24 is configured as a web server that hosts application business logic 33 for flight tracking, flight planning, content, and notification service, Database Server 12 is configured as a database server for storing aviation information provided by ASDI Server 41 and the remote users, and client computer 30 is configured for providing a user interface 32 for accessing the flight tracking, content, and notification service. User interface 32 of client computer 30 can be an installable application such as one that communicates with Web Server 24, can be browser-based, and/or can be embedded software, to name a few non-limiting examples.

In one embodiment, software installed locally on client computer 30 or user device 42 is used to communicate with Web Server 24. In another embodiment, Web Server 24 provides HTML pages, data from web services, and/or other Internet standard or company proprietary data formats to client computer 30 or user device 42 when requested. It shall be appreciated that in alternate forms client computer 30 and user device 42 may be any web-enabled device, such as a PDA, Blackberry, or mobile phone, to name just a few illustrative examples. One of ordinary skill in the art will recognize that the term web server is used generically for purposes of illustration and is not meant to imply that network 22 is required to be the Internet. As described previously, network 22 can be one of various types of networks as would occur to one of ordinary skill in the art. Data store 34 on Database Server 21 can store data such as flight tracking information, departure/arrival requests, aircraft information, and/or user content segments to name a few representative examples.

Gateway Server 26 includes business logic 35 and associated hardware allowing operation as an outgoing communication server, such as an autodialer and/or other suitable hardware, for distributing notifications to a user, as triggered by the novel service. In one form, Gateway Server 26 may initiate a digital communication session with user device 42 via network 22. In an alternate form Gateway Server 26 may initiate an analog communication session with user device 42 over the Telephone Network 40, which preferably includes the PSTN. In yet another form, Gateway Server 26 may transmit a notification in the form of a message, such as an email for SMS (text message), to user device 42 via network 22. Depending upon the type of notification requested by the remote user, user device 42 may be a traditional analog telephone, a mobile telephone or smart phone, such as one implementing GSM or CDMA technology, a digital telephone, such as a VoIP phone, or another computer, such as a server. It shall be appreciated that more than one user devices will be included in use of system 20, but that only one has been shown generically to preserve clarity. Further, it shall be appreciated that the types of user devices connected to system 20 need not be of the same type, but that digital, analog, and other technologies may be accommodated simultaneously.

In the illustrative embodiment, flight positioning information is received from ASDI Server 27 which is at least one server that is a part of the Aircraft Situation Display to Industry Service (ASDI) provided by the Federal Aviation Administration (FAA). The feed provided by the ASDI service may be in real time or delayed, such as subject to a five minute delay. Connections to the feed are established in a structured format according to Aircraft Situation Display to Industry: Functional Description and Interface Control Document (available at www.fly.faa.gov/ASDI/asdi.html).

Typical applications of system 20 would include more client computers, such as client computer 30, at various physical locations, although only one client computer 30 has been illustrated in FIG. 1 to preserve clarity. Furthermore, although four servers 24, 25, 26, and 27 are shown, it will be appreciated by those of ordinary skill in the art that the one or more features provided by Web Server 24, Database Server 25, and Gateway Server 26 could be provided by the same computer or varying other arrangements of computers at one or more physical locations and still be within the spirit of the invention. Farms of dedicated servers, a single proprietary system, and/or a Storage Area Network (SAN) could also be provided to support the specific features if desired. In the illustrative embodiment, in order to flexibly handle the large quantity of flight information received by the novel service, Database Server 21 includes a relational database, such as SQL, as is known to one of skill in the art.

Figure 2:
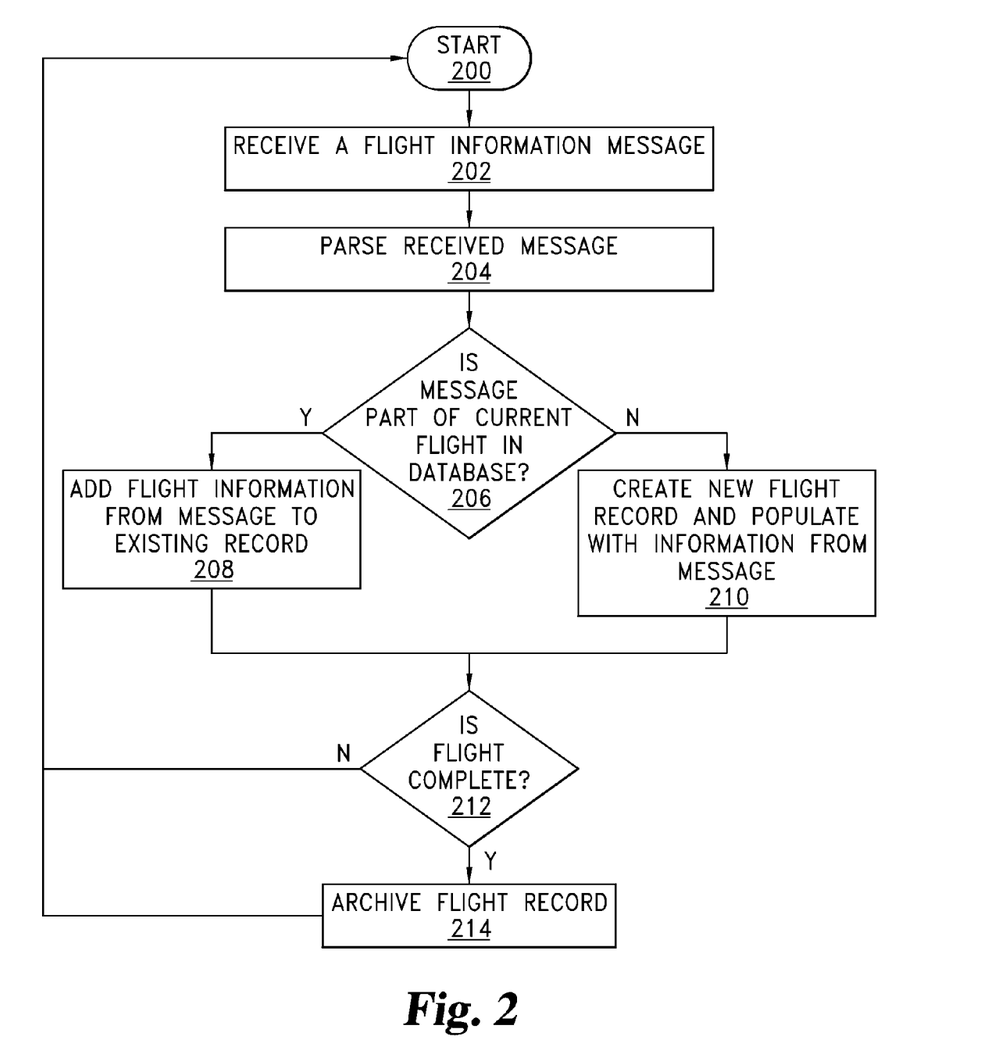
FIG. 2 is a process flow diagram illustrating the process of receiving and handling flight information in one embodiment of the present system and method illustrated in FIG. 1.

Turning to FIG. 2, with continued reference to FIG. 1, a flowchart illustrating the process of receiving and handling flight information is illustrated. The process begins at start point 200 with the novel service receiving a flight information message (stage 202) from ASDI server 27. In one form, the flight information messages are received and processed by Database Server 21. In other forms, various other servers may process the data prior to entry into the data store 34. The flight information messages may be of a variety of different types, with each type providing various fields of information. Shown below are a few representative examples of the type of messages received by Database Server 21:

| Message Type: | Content: |
|---|---|
| NAS AF | revised flight plan data whenever a flight plan is amended |
| NAS AZ | arrival data for all eligible arriving flights |
| NAS DZ | departure message |
| NAS FZ | initial flight plan data |
| NAS RZ | cancellation data |
| NAS TZ | flight position updates |
| NAS UZ | ARTCC flight plan information |

Additionally available data useful in the present invention is the Enhanced Traffic Management System, supplied by the FAA's Air Traffic Control System, which provides further information about predicted arrival times for flights.

Upon arrival, the flight information message is identified and assigned a type based upon the established formats provided by the ASDI service. Once the type of the message is identified, the message is parsed (stage 204) and the data is converted into a suitable format for insertion into Database Server 21. In one form, stage 204 may include the decoding of a message, the conversion of binary numbers to standard integers, the conversion of characters into words, and any other data conversion that may be required based upon the format of the received message and the format of the desired information for subsequent handling.

Once the contents of the message are obtained, the novel service identifies whether or not the message relates to an existing flight in the data store 34 (stage 206). If an existing flight record is found to which the contents of the message relate, the contents of the message are coupled with the existing information about the flight and the flight entry is updated (stage 206). In the event that the message does not relate to an existing flight, a new flight record is established and populated with the contents of the message (stage 210).

After a flight record is updated in stage 208 or created in stage 210, the novel service determines if the flight is complete (stage 212). In the illustrative embodiment, typically a flight is marked complete upon the receipt of an arrival (NAS AZ) or cancellation (NAS RZ) message. In a further form, the novel service may attempt to predict the arrival of a flight based upon a set of circumstances which may indicate that a flight has completed despite the absence of an arrival message. For example, if a flight record indicates that a flight has recently dropped below radar coverage near its destination proximate to its scheduled arrival time, the novel service may shortly thereafter enter an arrival message to eliminate the problem of frequent arrival message failure by the ASDI service. In either event, when the flight is determined to be complete the novel service archives the flight by compacting the flight record to minimize storage requirements going forward (stage 214) and awaits receipt of another flight information message. It shall be appreciated, that any number of flight information messages may be processed in parallel by the novel service and that FIG. 2 is simply illustrative of the sequential path of processing for a single flight information message. In addition, it shall be appreciated that a process may simply monitor the flight positioning information stream in order to analyze the current position of a selected flight in order to accomplish the functionality described herein.

Figure 3:
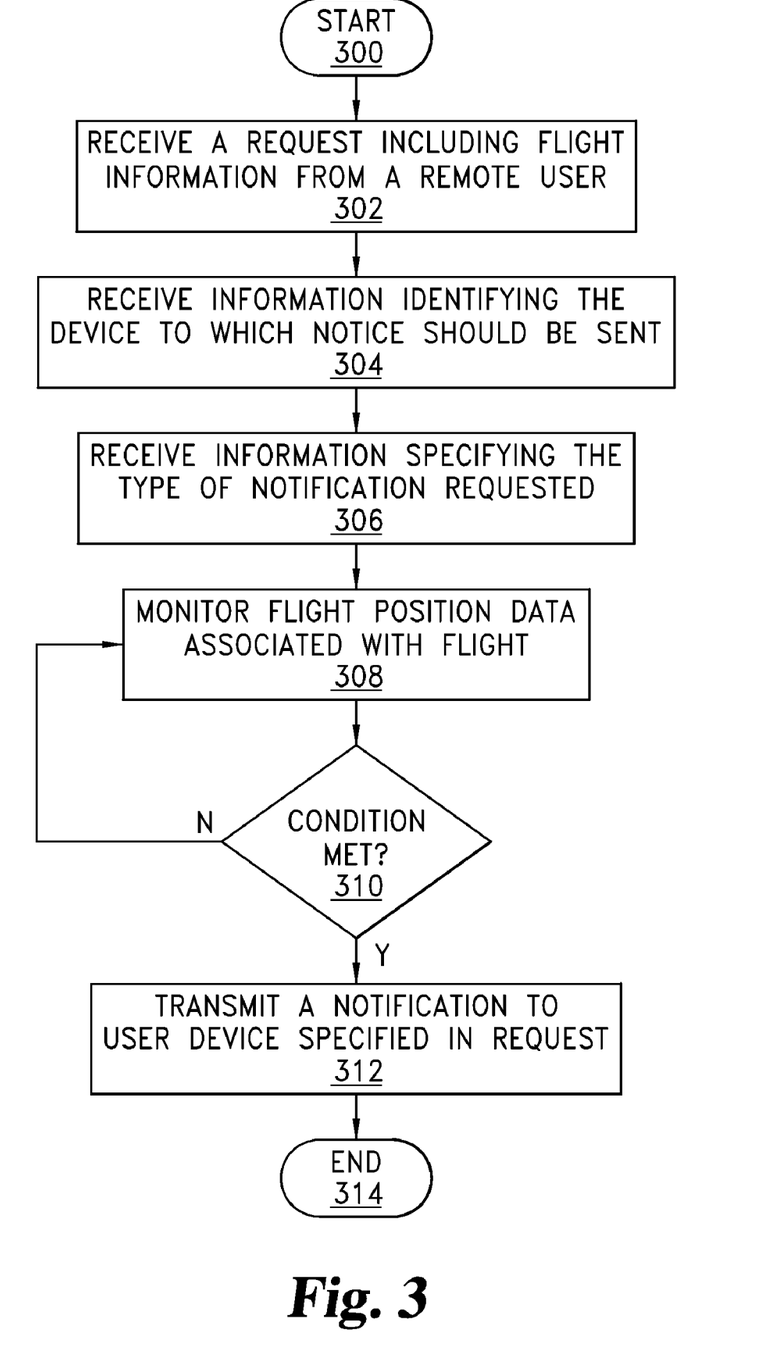
FIG. 3 is a process flow diagram illustrating the process for providing user flight notification according to one embodiment of the present invention.

Turning now to FIG. 3, with continued reference to FIG. 1, a flow chart illustrating the process for providing user flight notification according to one embodiment of the present invention is illustrated. The process begins at start point 300 with Web Server 24 of the novel service receiving a request from a remote user for a flight notification (stage 302). In the illustrated embodiment, the request is received in a predetermined structured format and includes information identifying a flight that the user is interested in. For purposes of non-limiting example, this information may include a flight number, tail number, origin, destination, and/or a scheduled departure date/time. In the event the information does not identify a unique flight, Web Server 24 may prompt the remote user with several options allowing them to search for and identify the specific flight of interest. Preferably, the request is entered by the remote user into client computer 30 or user device 42 and communicated over network 22.

Along with the request received in stage 302, the novel service also preferably receives information identifying a device to which the requested notification should be sent (stage 304). This information may be in the form of a telephone number, email address, or the like and preferably also include a notice type (i.e. text message, phone call, etc.) where appropriate. In an alternate form, the device identifying information may not be received, but rather may be predetermined based on a prior selection made in association with the user or general user settings, as would be appreciate to one of skill in the art.

Additionally, the novel service preferably receives information specifying the type of notification requested (stage 306). For example, one type of flight notification may be based upon a user specified time before anticipated arrival, while another may be based upon a set distance away from a destination. Still others may include a notification when a specified flight has passed over an object, such as the outer marker of the destination airport.

Once the specifics of the notification request have been received, business logic 33 of Web Server 24 begins monitoring the flight positioning data stored within data store 34 (as described with respect to FIG. 2). Business logic 33 continues to monitor the flight positioning data associated with the flight specified by the user in their request (stage 308). Based upon this information, the novel service determines if the flight position has met the condition specified by the user (stage 310). If not, the process returns to stage 308 and monitoring continues. In the event the flight position does meet the condition specified by the user, the novel service transmits a notification to the device specified by the user in the request (stage 312). Preferably, the type of information monitored by the novel service for purposes of triggering the requested notification is flight position data which indicates the near real-time position of the flight at least five minutes after its departure, as this information provides a more accurate arrival time than the scheduled arrival. The process ends at end point 314.

It is desirable not to burden users with numerous alert messages. Thus, apart from the optional initial confirmation(s) of the request for an alert, the system's first message of alert is sent substantially when the triggering event occurs. Thus if the user wants to be alerted 17 minutes before the flight lands, the first alert to the user will be sent when the a recent prediction of landing time indicates it is 17 minutes away. Use of substantially old or stale predictions of landing times is thus avoided.

Figure 4:
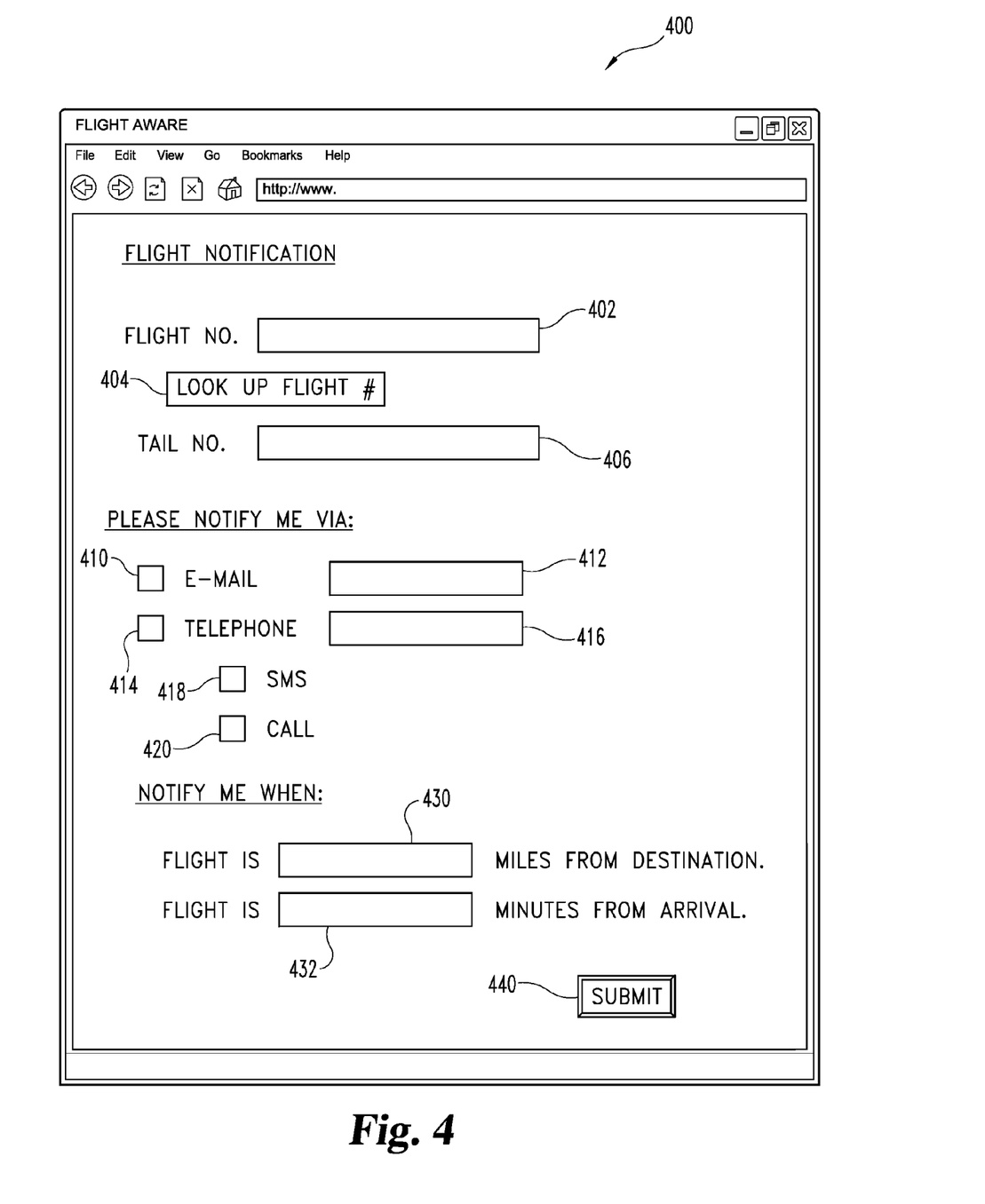
FIG. 4 is a diagrammatic view of a representative web page according to one embodiment of the present invention.

For purposes of illustration, FIG. 4 shows a sample web page 400 presented to a remote user on client computer 30 by Web Server 24. Web Page 400 includes a plurality of fields suitable for allowing the remote user to submit a request for notification. For purposes of identifying the specific flight the user is interested in, web page 400 includes flight number field 402, and aircraft tail number 406. The user may specify the airline and flight number or alternatively the user may select button 404 to be assisted in looking up the exact flight. Web page 400 also includes a number of fields which allow the user to specify the method of notification they prefer. A user may select checkbox 410 to receive notification via e-mail to an address specified in box 412. Alternatively or additionally, the user may select to receive notification via telephone by selecting check box 414 and providing a phone number in box 416. In addition, the notification may be requested to the telephone via SMS or text message by selecting checkbox 418 and/or a telephone call by selecting checkbox 420. Finally, the notification trigger may be specified as a number of miles in field 430 or a time in field 432. The novel service will generate the notification when the specified flight is the specified number of miles from its destination or a specified time prior to its predicted arrival. The user completes the form and transmits the information to Web Server 24 by selecting Submit button 440. It shall be appreciated that other notification triggers, notification delivery methods, and the like may be provided for in alternative embodiments.

A request submitted using the web page of FIG. 4 specifying a 30 minutes time prior to arrival is one type of notification request processed by the novel service. In order to provide this notification, the novel service monitors position data received by ASDI server 27. Based upon this position data and air speed information an estimated arrival time may be calculated that is more precise than the arrival time indicated in the flight's flight plan. When the time until the predicted arrival time matches the offset time (30 minutes) specified by the user, then the service initiates the notification process. It shall be appreciated by one of skill in the art the process for notifying a user when a flight is within a certain distance of its destination can be similarly performed based upon the flight's position data alone. While radar position data from the ASDI service is most preferred as the primary source to determine the time or position used to trigger the notification process, other sources of time or position could alternatively be used. For examples, GPS position data, or VOR-DME data are also quite satisfactory if obtained from a receiver on board the en route aircraft, where the relevant data is relayed to a remote location that provides the relevant Internet service.

Figure 5:
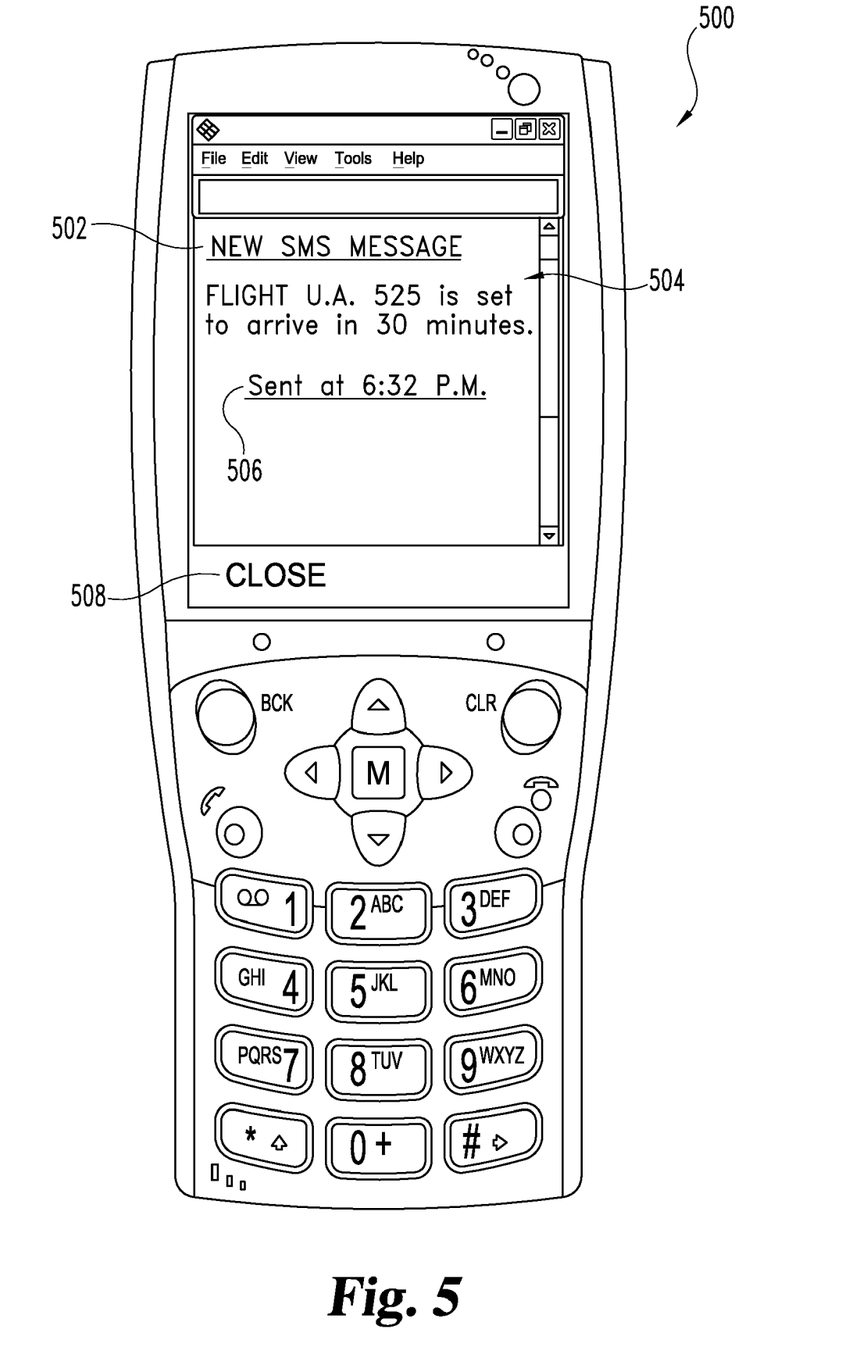
FIG. 5 is a diagrammatic view of a representative screen presented on a user device according to one embodiment of the present invention.

FIG. 5 illustrates a simple notification sent via SMS to a user device in response to a request for notification. The notification in this example was requested to be sent as an SMS to a specified mobile telephone number 30 minutes prior to the arrival of flight UA525 (such as by using the web page of FIG. 4). The text message 502 is received and processed by the mobile device 500 according to its pre-programmed fashion. However, the text message 502 includes a body 504 providing the flight number and alerting the user that the condition it requested has been met. In this case, text message 502 specifies that flight UA525 is within 30 minutes of arrival. Additionally, a time sent stamp 506 is preferably also included within the message 502. Therefore, in the event of a delay in receiving the notification the user will know the time the event they requested occurred.

Figure 6:
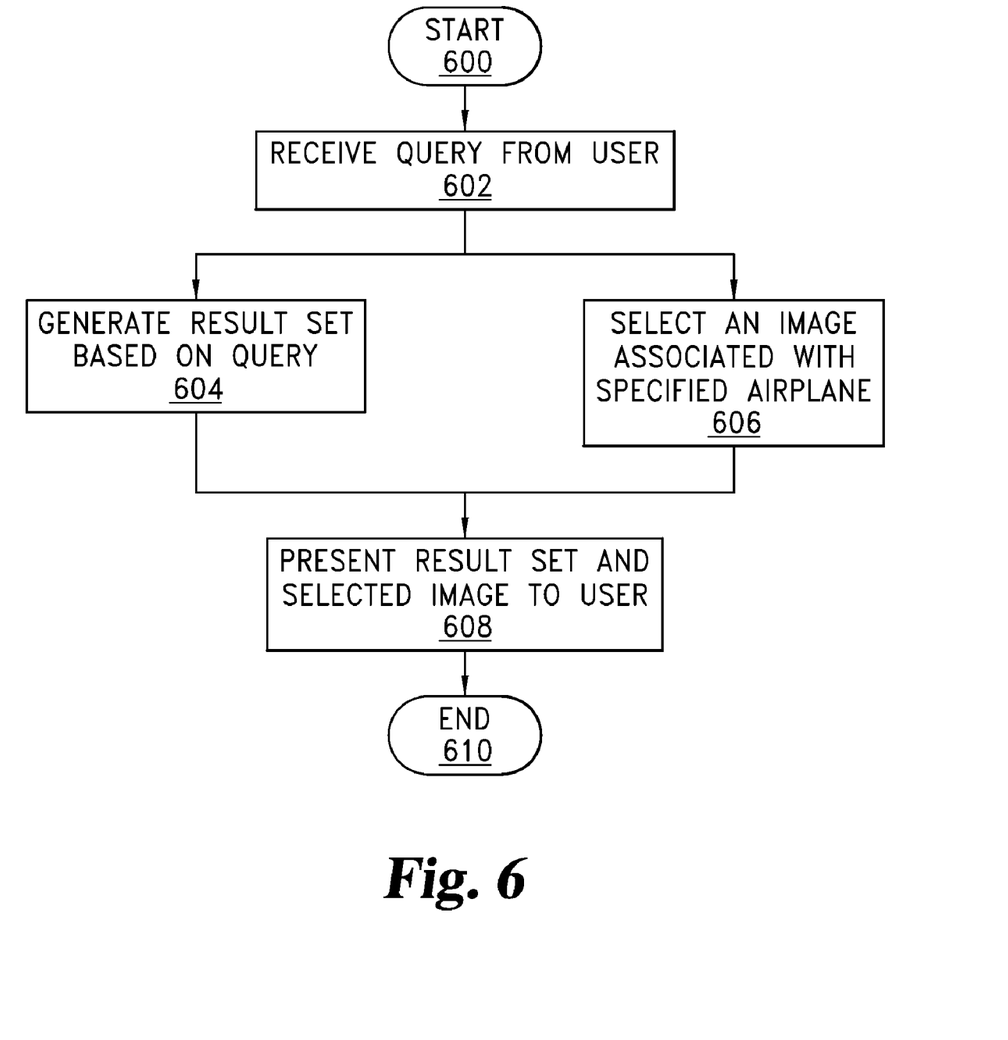
FIG. 6 is a process flow diagram illustrating the process for receiving, processing, and responding to a user query for flight tracking information and associated aircraft images.

Turning to FIG. 6, with continued reference to FIG. 1, the process for receiving, processing, and responding to a user query for flight tracking information and images is illustrated. The process begins at start point 600 with the user submitting a query (stage 602) to the flight position the novel service using a web interface and a predetermined structured format. The user query may include either a single term or a variety of terms in combination. These terms may include flight number, tail number, departure time, departure location, arrival time, and arrival location to name a few examples.

Once the query is received by the novel service at Web Server 24, the query is parsed and executed upon the database of current flight information stored in data store 34. A result set is generated (stage 604) which includes the flight which is specified in or most closely matches the query submitted by the user. Additionally, at least one user-submitted image is selected based upon the content of query submitted by the user (stage 606). Preferably, each user image is of a single aircraft and is tagged with information such as aircraft tail number, aircraft type, aircraft class, manufacturer, etc. As such, the image preferably has an associated tail number which matches the tail number of the flight specified in the query. As such, the user would be able to see the exact plane which will be making the flight of interest. Alternatively, an image has an associated aircraft type matching the type associated with the specified flight is selected.

Once the flight position information and image are retrieved, both are presented to the user in a convenient form via their web browser (stage 608). The query process ends at end point 610.

Figure 7:
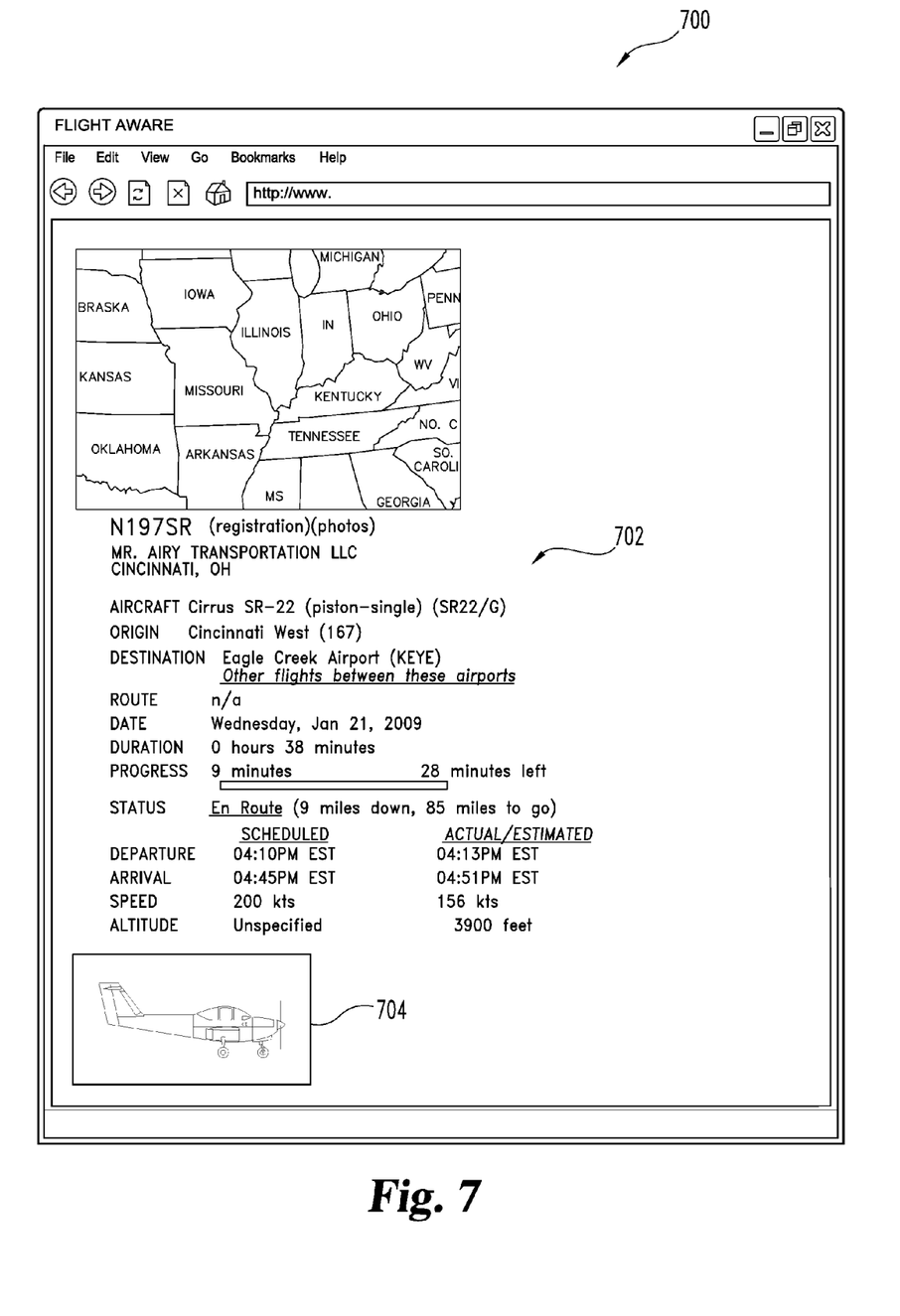
FIG. 7 is a diagrammatic view of a representative web page 700 containing both flight tracking information and an image of an aircraft as generated by the process of FIG. 6.

FIG. 7 shows a representative web page 700 containing both flight tracking information and an image of an aircraft as generated by the process of FIG. 6. Web page 700 includes flight tracking information within section 702, such as the current location of the specified aircraft. In addition, an image 704 is presented which is preferably a user submitted photo of the specified aircraft. Alternatively, the image 704 may be of a related aircraft or aircraft of the same or similar type for purposes of visual identification.

In an alternate embodiment, the novel service provides user-supplied content to a user when retrieving flight information, wherein the users are all within a defined group. For instance, users corresponding to member of a private aircraft rental service may have a group and store information regarding preferred FBOs, car service providers, and the like within the novel service as individual content segments in association with a geographic location, such as the airport at which they operate or are located.

Figure 8:
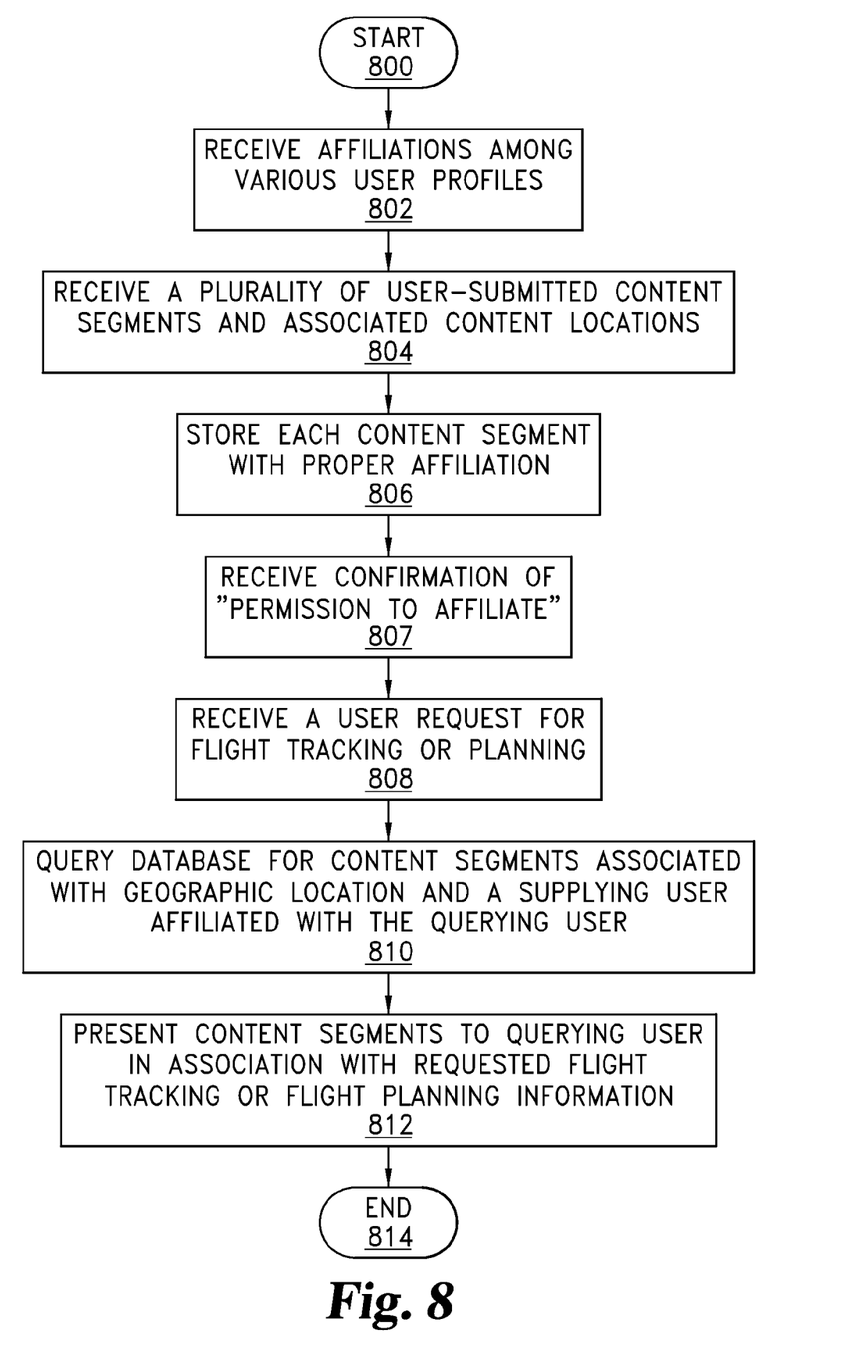
FIG. 8 is a process flow diagram illustrating one set of the steps performed in presenting additional information to a user during flight planning or flight tracking that is both geographically linked with the flight tracking/planning and was privately supplied by other members affiliated with the querying user.

In FIG. 8, a flow chart is shown illustrating one set of the steps performed in a process according to one form of the present invention for receiving remote user supplied-content in association with a content location and affiliations among the various users. When a querying remote user requests information associated with flight tracking or flight planning that is linked to a query location, the querying remote user is sent at least one content segment geographically linked to said query location and received from a supplying remote user having an affiliation with the querying user. Preferably as a condition for selectively sending, there is a prior confirmation of permission to affiliate.

The process begins at start point 800 with the novel service storing numerous supplying remote users (stage 802). For example, the user affiliations may include common interests or associations, such as a number of pilots all working for a private aircraft rental service, the members of an aviation club, or the like. The novel service then receives a plurality of user-submitted content segments (stage 804), where each content segment is submitted by the user in association with a geographic location, such as an aircraft, hospitality, or transportation service provider. For example, the content segments may be reviews of an FBO, caterer, limousine provider located on or servicing a selected airport, or information regarding a similar entity. In addition, each content segment is also associated with the supplying user profile. In one embodiment, the novel service requires the supplying user to log-in to the service to submit content segments or to confirm affiliations. Additionally forms of persistent user identification, such as cookies, may also be utilized for this purpose. Once received, the novel service stores each content segment within data store 34 of Database Server 25 (stage 806). In the preferred form, the service requires a prior confirmation of permission to affiliate as a condition to sending contents segments to a querying user (stage 807).

Web server 24 then receives a request from a querying remote user for flight tracking or flight planning information using client computer 30 (stage 808). Such a request relates to at least one geographic location, and may include both an origin and destination airport. In addition, the request is submitted on behalf of a querying user having an affiliation with other supplying users. The request may be for flight planning or flight tracking information as stored by data store 34. Once the request is received, business logic 33 queries data store 34 for any content segments that are both associated with a location linked to the query, and supplied by a supplying user affiliated with the querying user (stage 810). In the event content segments are identified which meet these criteria, one or more are presented to the querying user in a manner associated with the requested information relating to flight tracking or flight planning (stage 812). In a further form, each user profile includes at least one associated geographic location indicating a home location. In a still further form, a user profile may also include a current location. According to these forms, the user profile of various other users sharing a common affiliation with the requesting user may also be presented, alerting the querying user that those users, who may be friends, colleagues, or acquaintances, are located permanently or temporarily in or near one of the geographic areas specified. The process ends at end point 814.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

What is claimed is:

1. A method facilitating the combination of user-contributed individual aircraft images to data about the proximate arrival or departure of that aircraft comprising:
   obtaining electronic data including a first aircraft tail number from recent FAA filed flight plan data as to an aircraft arriving to or leaving from a user specified airport;
   querying, by using said first aircraft tail number without user re-entry, an electronic database containing aircraft images contributed through an automated, user-accessible system, to select an image of the actual aircraft that is associated with such aircraft tail number; and
   displaying the image of the actual aircraft which aircraft has an associated tail number matching the tail number in the query along with recent FAA filed flight plan data.

2. A method for providing user-contributed individual aircraft images in association with provided flight tracking information, said method comprising the steps of:
   receiving a plurality of digital images of individual aircraft from a plurality of remote users;
   storing said plurality of images within an electronic database, wherein each image within said plurality is associated with an aircraft tail number;
   receiving a request from a remote user for flight tracking data;
   selecting from said electronic database a digital image of the actual aircraft assigned the tail number of an aircraft where the aircraft is included in the flight tracking data; and
   transmitting said selected digital image and the requested flight tracking data to said remote user over said digital network to enable the remote user to display the digital image.

3. The method of claim 2, wherein said receiving of images is over the Internet.

4. The method of claim 2, wherein said receiving of a request is over the Internet.

* * * * *